(12) United States Patent
Iijima et al.

(10) Patent No.: US 8,794,755 B2
(45) Date of Patent: Aug. 5, 2014

(54) PRINTED MATTER PRODUCTION PROCESS, PRINTED MATTER AND ACTINIC RAY CURABLE INKJET INK

(75) Inventors: Hirotaka Iijima, Hachioji (JP); Toshiyuki Takabayashi, Hachioji (JP); Akio Maeda, Hachioji (JP)

(73) Assignee: Konica Minolta Holdings, Inc. (JP)

( * ) Notice: Subject to any disclaimer, the term of this patent is extended or adjusted under 35 U.S.C. 154(b) by 128 days.

(21) Appl. No.: 13/581,363

(22) PCT Filed: Mar. 9, 2011

(86) PCT No.: PCT/JP2011/055476
§ 371 (c)(1),
(2), (4) Date: Aug. 27, 2012

(87) PCT Pub. No.: WO2011/111733
PCT Pub. Date: Sep. 15, 2011

(65) Prior Publication Data
US 2012/0327157 A1    Dec. 27, 2012

(30) Foreign Application Priority Data
Mar. 12, 2010    (JP) ................. 2010-055580

(51) Int. Cl.
*B41J 2/01*    (2006.01)
*B41J 11/00*   (2006.01)
*B41J 2/21*    (2006.01)

(52) U.S. Cl.
CPC ............. *B41J 11/002* (2013.01); *B41J 2/2107* (2013.01); *B41J 11/0015* (2013.01)
USPC ................. 347/102; 347/95; 347/99; 347/100

(58) Field of Classification Search
CPC ........ B41J 2/01; B41J 2/2107; B41J 11/0015; B41J 11/002; C09D 11/00; C09D 11/30; C09D 11/34; C09D 11/101
USPC .............. 347/88, 95–100, 102; 523/160, 161; 106/13.13, 31.27, 31.6
See application file for complete search history.

(56) References Cited

U.S. PATENT DOCUMENTS

| | | | |
|---|---|---|---|
| 2003/0092820 A1 | 5/2003 | Schmidt et al. | |
| 2008/0000384 A1* | 1/2008 | Belelie et al. | 106/31.13 |
| 2009/0046134 A1* | 2/2009 | Belelie et al. | 347/102 |
| 2009/0291225 A1* | 11/2009 | Takabayashi | 427/487 |

FOREIGN PATENT DOCUMENTS

JP    2005-504860 A    2/2005

(Continued)

OTHER PUBLICATIONS

International Search Report for International Application No. PCT/JP2011/055476 mailing date of May 24, 2011 with English Translation.

*Primary Examiner* — Matthew Luu
*Assistant Examiner* — Rut Patel
(74) *Attorney, Agent, or Firm* — Cantor Colburn LLP (57) ABSTRACT

A printed matter production process including ejecting droplets of an actinic ray curable inkjet ink in a heated state through a head to supply the droplets onto a recording medium, thereby forming an image, the actinic ray curable inkjet ink including a polymerizable compound, a photopolymerization initiator and a gelling agent, having a viscosity of from 60 to 200 mPasecond at 25° C. and at a shear rate of 1000/second and showing a phase transition at a temperature of not lower than 25° C., characterized in that the actinic ray curable inkjet ink includes a bifunctional polymerizable compound with a molecular weight of not lower than 400 and with a viscosity at 25° C. of not more than 100 mPasecond in an amount of not less than 75 % by mass of the total amount of the polymerizable compound.

6 Claims, 1 Drawing Sheet

(56) References Cited

FOREIGN PATENT DOCUMENTS

| | | | |
|---|---|---|---|
| JP | 2005-126507 A | 5/2005 |
| JP | 2005-126509 A | 5/2005 |
| JP | 2009-510184 A | 3/2009 |
| JP | 2009-280672 A | 12/2009 |
| WO | 2007/025893 A1 | 3/2007 |

* cited by examiner

PRINTED MATTER PRODUCTION PROCESS, PRINTED MATTER AND ACTINIC RAY CURABLE INKJET INK

CROSS REFERENCE TO PEALTED APPLICATIONS

This is a U.S. national stage application No. PCT/JP2011/055476, filed 9 Mar. 2011. Priority under 35 U.S.C. §119(a) and 35 U.S.C. §365(b) is claimed from Japanese Application No. 2010-055580, filed 12 Mar. 2010, the disclosure of which are also incorporated herein by reference.

FIELD OF THE INVENTION

The present invention relates to a printed matter production process, which forms a plane image according to an inkjet method, employing an actinic ray curable ink, and to an actinic ray curable inkjet ink used in the process.

TECHNICAL BACKGROUND

Heretofore, an actinic ray curable ink which is cured with an active energy radiation such as an ultraviolet ray and an electron beam, is put into practical use in various applications such as coating materials for plastics, paper sheets, woodworks and inorganic materials; adhesive agents; printing inks; print circuit boards; and electric insulations.

As the polymerizable ink, there is an ultraviolet ray curable inkjet ink which is cured by ultraviolet ray radiation, is well known. In recent years, attention is being paid to the inkjet recording method using the ultraviolet ray curable inkjet ink from the viewpoints that the ink is rapidly dried and the method enables recording (printing) onto a recording medium without ink absorption property.

However, in the recording (printing) method which uses the ultraviolet ray curable inkjet ink, coalescence of adjacent dots, which is a problem during high-speed recording (for example, with a transportation speed of a recording medium of 15 m/s or more in a line recording method or with a printing speed of 20 m²/hour in a serial (shuttle) recording method) cannot be fully prevented. As a result, there occurs a problem of deterioration of image quality in an image formed by printing.

As a method to solve such a problem, there is a method in which an image is recorded on a recording medium through an inkjet process, employing an ink which is in a solid state at ordinary temperature and heated to a liquid state (see Patent Document 1). However, even when a radiation curable ink is employed which is in a solid state at ordinary temperature and heated to a liquid state, there is still problem in that a satisfactory image quality is not obtained.

As an ink containing a gelling agent, there is known an ink for three dimension inkjet printing, for example, one containing a polymerizable compound and wax which functions as a gelling agent (see Patent Document 2). Further, it is known that an ultraviolet ray curable urethane acrylate resin with a relatively high molecular weight is used as the polymerizable compound in order to form a three dimension structure.

However, an inkjet ink for the three dimension inkjet printing has, in the so-called high speed printing forming a plane image at high speed as described above, problem in that ink ejection properties are poor and ink supplied to a recording medium sterically solidifies, resulting in poor plane image. Therefore, the inkjet ink itself cannot be applied.

Further, when supplying the inkjet ink containing a gelling agent onto a recording medium, converting the ink to a gel state on the recording medium, and exposing the gelled ink to actinic rays to polymerize a polymerizable compound, there occurs the phenomenon that the recording medium curls on account of shrinkage (cure shrinkage) of image portions due to the polymerization. Since volume shrinkage (reduction) occurs by action of the gelling agent during gelling, the degree of this cure shrinkage of the inkjet ink containing a gelling agent is large as compared with that of a conventional actinic ray curable inkjet ink which does not contain a gelling agent.

PRIOR ART

Patent Literatures

Patent Document 1: Japanese Unexamined Patent Application Publication (Translation of PCT Application) No. 2009-510184
Patent Document 2: Japanese Unexamined Patent Application Publication (Translation of PCT Application) No. 2005-504860

DISCLOSURE OF THE INVENTION

Problems to be Solved by the Invention

An object of the invention is to provide a printed matter production process, which excels in ink ejection properties, enables high speed printing, and provides a printed matter having an image with high precision image quality, excellent stability and reduced deformation, a printed matter produced by that process, and an actinic ray curable inkjet ink used in that process.

Means for Solving the Above Problems

The above object of the invention is attained by the following constitutions.

1. A printed matter production process comprising ejecting droplets of an actinic ray curable inkjet ink in a state heated to the phase transition temperature or higher through a head to supply the droplets onto a recording medium, thereby forming an image, the actinic ray curable inkjet ink containing a polymerizable compound, a photopolymerization initiator and a gelling agent, having a viscosity of from 60 to 200 mPasecond at 25° C. and at a shear rate of 1000/second and showing a phase transition at a temperature of not lower than 25° C., characterized in that the actinic ray curable inkjet ink contains a bifunctional polymerizable compound with a molecular weight of not lower than 400 and with a viscosity at 25° C. of not more than 100 mPasecond in an amount of not less than 75% by mass of the total amount of the polymerizable compound.

2. The printed matter production process as described in item 1 above, characterized in that the actinic ray curable inkjet ink contains the gelling agent in an amount of from 3.0 to 20% by mass.

3. A printed matter characterized in that it is produced according to the printed matter production process as described in item 1 above.

4. An actinic ray curable inkjet ink used in the printed matter production process as described in item 1 or 2 above, characterized in that the actinic ray curable inkjet ink contains a polymerizable compound and a gelling agent, has a viscosity of from 60 to 200 mPasecond at 25° C. and at a shear rate of 1000/second, and shows a phase transition at a temperature of not lower than 25° C., the actinic ray curable inkjet ink containing a bifunctional polymerizable compound with a molecular weight of not lower than 400 and with a viscosity at 25° C. of not more than 100 mPa·se in an amount of not less than 75% by mass of the total amount of the polymerizable compound.

5. An actinic ray curable inkjet ink characterized in that the actinic ray curable inkjet ink contains a polymerizable compound and a gelling agent, has a viscosity of from 60 to 200 mPasecond at 25° C. and at a shear rate of 1000/second, and shows a phase transition at a temperature of not lower than 25° C., the actinic ray curable inkjet ink containing a bifunctional polymerizable compound with a molecular weight of not lower than 400 and with a viscosity at 25° C. of not more than 100 mPa·se in an amount of not less than 75% by mass of the total amount of the polymerizable compound.

Effect of the Invention

In the printed matter production process of the invention comprising ejecting droplets of an actinic ray curable ink in a state heated to the phase transition temperature or higher through a head to supply the droplets onto a recording medium, thereby forming an image, the actinic ray curable ink contains a polymerizable compound, a photopolymerization initiator and a gelling agent, has a viscosity of from 60 to 200 mPasecond at 25° C. and at a shear rate of 1000/second and shows a phase transition at a temperature of not lower than 25° C., the actinic ray curable inkjet ink containing a bifunctional polymerizable compound with a molecular weight of not lower than 400 and with a viscosity at 25° C. of not more than 100 mPasecond in an amount of not less than 75% by mass of the total amount of the polymerizable compound. The actinic ray curable ink as above can be cured even in a low exposure amount, and when the ink is gelled and cured by irradiation of actinic rays, can prevent shrinkage due to the curing. The above ink composition can provide a printed matter production process, which excels in ink ejection properties, enables high speed printing, and provides a printed matter having an image with high precision image quality, excellent stability and reduced deformation; a printed matter produced by that process; and an actinic ray curable inkjet ink used in that process.

BRIEF EXPLANATION OF DRAWING

FIG. 1 shows a schematic side view and front view of an example of an inkjet recording head used in the printed matter production process of the invention.

PREFERRED EMBODIMENT FOR CARRYING OUT THE INVENTION

The present invention is a printed matter production process comprising ejecting droplets of an actinic ray curable ink in a state heated to the phase transition temperature or higher through a head to supply the droplets onto a recording medium, thereby forming an image, the actinic ray curable ink containing a polymerizable compound, a photopolymerization initiator and a gelling agent, having a viscosity of from 60 to 200 mPasecond at 25° C. and at a shear rate of 1000/second and showing a phase transition at a temperature of not lower than 25° C., which is characterized in that the actinic ray curable inkjet ink contains a bifunctional polymerizable compound with a molecular weight of not lower than 400 and with a viscosity at 25° C. of not more than 100 mPasecond in an amount of not less than 75% by mass of the total amount of the polymerizable compound.

In the invention, the ink containing a polymerizable compound, and containing a bifunctional polymerizable compound with a molecular weight of not lower than 400 and with a viscosity at 25° C. of not more than 100 mPasecond in an amount of not less than 75% by mass of the total amount of the polymerizable compound, can provide a printed matter production process, which is excellent in ink ejection properties and is capable of forming an image with high precision at high speed.

<Actinic Ray Curable Inkjet Ink (Hereinafter Also Referred to Simply as Inkjet Ink)>
(Photopolymerization Initiator)

The photopolymerization initiator in the invention is a compound capable of initiating polymerization of a polymerizable compound by action of light. As the photopolymerization initiator, any known photopolymerization initiators, as described in "Application and Market of UV•EB Curing Technologies" (C. M. C Shyuppan, supervised by Yoneho Tabata and edited by Radotech Study Group), and so forth, can be utilized.

As the photopolymerization initiator, listed are a photoacid generating agent and a photoradical generating agent.

As the photoradical generating agents, there can be used known photoradical generating agents such as aryl alkyl ketones, oxime ketones, thiobenzoic acid S-phenyl, titanocene, aromatic ketones, thioxanthone, benzyl and quinone derivatives, and ketocoumarins.

Of these, acylphosphine oxides and acylphosphonates are preferably used in view of sensitivity.

Specifically, bis(2,4,6-trimethylbenzoyl)-phenylphosphine oxide and bis(2,6-dimethoxybenzoyl)-2,4,4-trimethylpentylphosphine oxide are preferred.

Further, 1-hydroxycyclohexyl phenyl ketone, 2-methyl-1 [4-(methylthio)phenyl-2-morpholinopropane-1-one, bis(2, 6-dimethoxybenzoyl)-2,4,4-trimethyl-pentylphosphine oxide, and 2-hydroxy-2-methyl-1-phenyl-propane-1-one (DAROCURE (trade name) 1173) are suitably used in view of safety.

As a photo-acid generating agent, any compound used, for example, in chemical sensitization-type photoresists and photo-cationic polymerization is used (refer to pages 187-192 of "Imaging Yo Yuki Zairyo" edited by Yuki Electronics Zairyo Kenkyukai and published by Bunshin Shuppan (1993). Examples of compounds suitably used in the present invention include $B(C_6F_5)_4^-$, $PF_6^-$, $AsF_6^-$, $SbF_6^-$, and $CF_3SO_3^-$ salts of aromatic onium compounds such as diazonium, ammonium, iodonium, sulfonium and phosphonium, sulfonated compounds releasing a sulfonic acid, halogenated compounds photolytically releasing a hydrogen halide, and iron arene complexes.

All known photo-acid generating agent can be used as the photopolymerization initiator in the present invention. When the photopolymerization initiator is incorporated in the inkjet ink, a solvent is preferably used in which the initiator is dissolved. Herein, as compounds, which are capable of easily dissolving a photoacid generating agent at ordinary temperature (around 25° C.), for example, cyclic ester compounds and carbonic acid ester compounds are preferably employed. Specific examples thereof include ethylene carbonate, propylene carbonate, β-propiolactone, β-butyrolactone, α-methyl-β-butyrolactone, γ-butyrolactone, γ-valerolactone, δ-valerolactone, ε-caprolactone, γ-caprolactone, and γ-heptanolactone. These cyclic ester compounds can be suitably employed from the viewpoint that reversible gelation is efficiently carried out.

The addition amount of the photopolymerization initiator is preferably from 1 to 10% by mass, and more preferably from 2 to 8% by mass, based on the total amount of the inkjet ink.

(Polymerizable Compound)

In the printed matter production process of the invention, the ink jet ink contains a bifunctional polymerizable compound with a molecular weight of not lower than 400 and with a viscosity at 25° C. of not more than 100 mPasecond in an amount of not less than 75% by mass of the total amount of the polymerizable compound.

As the bifunctional polymerizable compound with a molecular weight of not lower than 400 and with a viscosity at 25° C. of not more than 100 mPasecond, there are mentioned the following compounds:

polyethylene glycol di(meth)acrylate, polypropylene glycol di(meth)acrylate, ethoxylated 1,6-hexanediol di(meth)acrylate, and ethoxylated neopentyl glycol di(meth)acrylate.

As for these compounds, trade name A-400 (polyethylene glycol diacrylate with an EO number of 9), trade name APG (polypropylene glycol diacrylate with a propylene oxide number of 7), trade name APG 700 (polypropylene glycol diacrylate with an propylene oxide number of 12), trade name 9G (polyethylene glycol dimethacrylate with an EO number of 9), and trade name 14G (polyethylene glycol dimethacrylate with an EO number of 14) each are available from Shin-Nakamura Chemical Co., Ltd., and trade name SR 603 and trade name CD 561 each are available from Sartomer Co., Ltd.

As is described above, it is necessary that the actinic ray curable inkjet ink of the invention contain a bifunctional polymerizable compound with a molecular weight of not lower than 400 and with a viscosity at 25° C. of mot more than 100 mPasecond in an amount of not less than 75% by mass of the total amount of the polymerizable compound. It is preferred that actinic ray curable inkjet ink contain the bifunctional polymerizable compound in an amount of not less than 80% by mass of the total amount of the polymerizable compound.

Incorporation in the actinic ray curable inkjet ink of the above bifunctional polymerizable compound as a main component of the polymerizable compound can provide a satisfactory result in ejection properties of ink from an inkjet nozzle during high speed printing and in image properties.

In the invention, the actinic ray curable inkjet ink containing the gelling agent rapidly gels immediately after the ink is deposited on a printing material (a recording medium), which can prevent image quality deterioration resulting from formation of ink pool due to coalescence of adjacent ink dots. As a result, it has been found that superior image quality is obtained, the reason is probably because the high molecular weight of the polymerizable compound enables rapid gel formation. However, there is an interrelation between molecular weight and viscosity, and a polymerizable compound with a high molecular weight often has a high viscosity.

Further, in order to stably eject ink from an inkjet head, it is necessary that the viscosity of the ink itself be within an appropriate range, however, it is necessary as a sufficient condition that the main materials constituting the ink do not have a high viscosity. Taking into consideration the conditions as described, the present inventors have extensively investigated on application to the inkjet ink in the invention, and as a result, they have found that it is necessary that a main polymerizable compound accounting for not less than 75% by mass of the polymerizable compound is a bifunctional polymerizable compound with a molecular weight of not lower than 400 and with a viscosity at 25° C. of not more than 100 mPasecond.

That is, in the invention, the main polymerizable compound, which accounts for not less than 75% by mass of the polymerizable compound contained in the inkjet ink of the invention, is the bifunctional polymerizable compound as described above. Such an ink composition can provide an ink which is excellent in ink ejection properties and is capable of high speed printing, and can provide a printed matter having an image with high precision image quality, excellent stability and reduced deformation.

The molecular weight of the bifunctional polymerizable compound in the invention is not lower than 400, however, the molecular weight is preferably not higher than 1500, and more preferably not higher than 1000, since the bifunctional polymerizable compound is incorporated in the inkjet ink so that the viscosity of the inkjet ink at 25° C. and at a shear rate of 1000/second is in the range of from 60 to 200 mPasecond.

As long as the effect of the invention is not jeopardized, the inkjet ink of the invention may contain, as the polymerizable compound, a polymerizable compound other than those as described above, provided that the viscosity of the inkjet ink is from 60 to 200 mPasecond at 25° C. and at a shear rate of 1000/second.

As the polymerizable compound other than those as described above, there are mentioned a known radically polymerizable compound and a known cationically polymerizable compound.

As the radically polymerizable compound, there are mentioned various compounds having a (meth)acrylate group. Examples thereof include monofunctional monomers such as isoamyl acrylate, stearyl acrylate, lauryl acrylate, octyl acrylate, decyl acrylate, isomiristyl acrylate, isostearyl acrylate, 2-ethylhexyl-diglycol acrylate, 2-hydroxybutyl acrylate, 2-acryloyloxyethyl hexahydrophthalic acid, butoxyethyl acrylate, ethoxydiethyleneglycol acrylate, methoxydiethyleneglycol acrylate, methoxypolyethylene glycols acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, 2-acryloyloxyethylsuccinic acid, 2-acryloyloxyethyl phthalic acid, 2-acryloyloxyethyl-2-hydroxyethylphthalic acid, lactone modified flexible acrylate and t-butylcyclohexyl acrylate; and bifunctional monomers such as triethylene glycol diacrylate, tetraethylene glycol diacrylate, tripropylene glycol diacrylate, 1,4-butanediol diacrylate, 1,6-hexanediol diacrylate and 1,9-nonanediol diacrylate.

A monofunctional (meth)acrylate is preferably incorporated in the inkjet ink in view of viscosity adjustment or flexibility adjustment, and a polyfunctional (meth)acrylate having three or more functional groups is preferably incorporated in the ink in view of curing sensitivity, adhesion property or image film strength. It is especially preferred that the polymer compound include therein a polyfunctional (meth)acrylate having three or more functional groups in an amount of 20% by mass or less.

Further, a polymerizable compound having a cyclic structure is preferably used. Examples of the polymerizable compound having a cyclic structure include NK ESTER A-DOG and NK ESTER LR A-DCP (each produced by Shin-Nakamura Chemical Co., Ltd.).

Examples of the cationically polymerizable compound include styrene derivatives, vinyl ethers, oxiranes, oxetanes, tetrahydrofuran, lactams and lactones. Of these, oxiranes, oxetanes, vinyl ether compounds or styrene derivatives are preferably used. Especially, vinyl ether compounds are preferably used in view of curability.

(Gelling Agent)

The gelling agent in the present invention refers to a compound which can reversibly gel an ink jet ink.

Next, a gelling agent which can reversibly gel an inkjet ink (hereinafter also referred to as an ink composition) will be explained.

The "gel state" in the present invention refers to a state in which solutes form a structure such that the solutes lose independent mobility and aggregate due to a lamella structure, a polymer network with a covalent bond or a hydrogen bond, or a polymer network formed by physical coagulation and in which the solutes are solidified or semi-solidified, accompanied by rapid increase of viscosity or remarkable increase of elasticity.

A gel state formed by a compound which can reversibly gel the ink composition in the present invention is a heat reversible gel which is converted to a solution with fluidity (also referred to as a sol) by heating. Namely, the ink composition used in the present invention exhibits thermally reversible transition between a gel state and a liquid state, and this gel reformation cycle can be repeated several times.

Typical examples of the compound which can gel reversibly the ink composition preferably used in the present include a lower molecular weight compound with a molecular weight of less than 1000 such as stearone (18-pentatriacontanone), 16-hentriacontanone, 12-tricosanone, fatty acid esters, stearoyl inulin, dextrin fatty acid esters, L-glutamic acid derivatives, fatty acid amides (urethanes), glyceryl behenate/eicosadioate or an oil gelling agent disclosed in Japanese Patent O.P.I. Publication Nos. 2005-126507 and 2005-255821, however, the present invention is not limited thereto.

The inkjet ink in the present invention contains the gelling agent as described above and shows a phase transition at a temperature of not lower than 25° C. or higher. The inkjet ink which shows a phase transition at a temperature of not lower than 25° C. refers to an inkjet ink having a phase transition temperature at a temperature of not lower than 25° C. The phase transition temperature refers to a value measured through the following differential scanning calorimetry.

Differential Scanning calorimetry (DSC):

In the DSC220C/SSC5200 station produced by Seiko Denshi Co., Ltd., temperature of the inkjet ink is changed from 20° C. to 100° C. and then from 100° C. to 20° C. under a nitrogen atmosphere at a rate of 10° C./minute, and a temperature giving an exothermic peak at the temperature falling process from 100° C. to 20° C. is defined as the phase transition temperature.

In the present invention, the phase transition temperature is preferably from 40 to 100° C., and more preferably from 45 to 85° C. in view of prevention of coalescence between of adjacent dots or inhibitory property of thermal polymerization.

In order to adjust so that the phase transition temperature of the actinic ray curable inkjet ink of the present invention falls within the above temperature range, it is preferred that the gelling agent is contained in the inkjet ink in an amount of from 3.0 to 20% by mass based on the inkjet ink.

The actinic ray curable inkjet ink of the present invention is in a gel state or in a solid state at 25° C., and has a viscosity of from 60 to 200 mPasecond at 25° C. and at a shear rate of 1000/second.

The viscosity herein referred to is a viscosity at 25° C. and at a shear rate of 1000/second, measured employing a Rheometer MCR300 produced by Paar Physica Co., Ltd.

The inkjet ink, which is in a gel state or in a solid state, and has a viscosity of from 60 to 200 mPasecond at 25° C. and at a shear rate of 1000/second, can be prepared by containing the gelling agent in the amount range as described above, and by adjusting kinds and amount of the polymerizable compound other than the bifunctional polymerizable compound in the invention as described above.

The gel state refers to a state in which deformation is caused by application of stress and fluidity is markedly lowered.

The actinic ray curable inkjet ink may contain a basic compound in order to improve the ejection stability.

As the basic compound, various known basic compounds may be used. Typical examples thereof include basic alkali metal compounds, basic alkali earth metal compounds, and basic organic compounds such as amines.

As the basic alkali metal compounds listed are alkali metal hydroxides (such as lithium hydroxide, sodium hydroxide and potassium hydroxide), alkali metal carbonates (such as lithium carbonate, sodium carbonate and potassium carbonate), and alkali metal alcoholates (such as sodium methoxide, sodium ethoxide, potassium methoxide and potassium ethoxide).

As the basic alkaline earth metal compounds listed are alkaline earth metal hydroxides (such as magnesium hydroxide and calcium hydroxide), alkali metal carbonates (such as magnesium carbonate and calcium carbonate), and alkali metal alcoholates (such as magnesium methoxide).

As the basic organic compounds listed are amines and nitrogen containing heterocyclic compounds such as quinoline and quinolizine. Of these, amines are preferred from the viewpoint of compatibility with a photopolymerizable monomer. Examples of the amines include octylamine, naphthylamine, xylenediamine, dibenzylamine, diphenylamine, dibutylamine, dioctylamine, dimethylaniline, quinuclidine, tributylamine, trioctylamine, tetramethyl ethylenediamine, tetramethyl-1,6-hexamethylenediamine, hexamethylenetetramine, 2-(methylamino)ethanol and triethanolamine.

The content of the basic compound is from 10 to 50,000 ppm by mass, and preferably from 100 to 5000 ppm by mass, based on the total amount of the photopolymerizable monomer. The basic compounds may be used singly or as an admixture of two or more kinds thereof.

The inkjet ink preferably contains any known dyes and/or pigments, and more preferably pigments.

Pigments preferably utilized in the invention will be listed below.

C.I. Pigment Yellow 1, 2, 3, 12, 13, 14, 16, 17, 73, 74, 75, 81, 83, 87, 93, 95, 97, 98, 109, 114, 120, 128, 129, 138, 150, 151, 154, 155, 180, 185, 213

C.I. Pigment Red 5, 7, 12, 22, 38, 48:1, 48:2, 48:4, 49:1, 53:1, 57:1, 63:1, 101, 112, 122, 123, 144, 146, 168, 184, 185, 202

C.I. Pigment Violet 19, 23,

C.I. Pigment Blue 1, 2, 3, 15:1, 15:2, 15:3, 15:4, 18, 22, 27, 29, 60

C.I. Pigment Green 7, 36,

C.I. Pigment White 6, 18, 21,

C.I. Pigment Black 7

To disperse the above-described pigment, for example, a ball mill, a sand mill, an attritor mill, a roll mill, an agitator, a Henschel mixer, a colloid mixer, an ultrasonic homogenizer, a pearl mill, a wet jet mill, a paint shaker, etc. can be utilized.

Further, a dispersant can be added on dispersion of a pigment. As the dispersant, a polymer dispersant is preferably utilized. Examples of the polymer dispersant include Solsperse series produced by Avecia Co. and PB series produced by Ajinomoto Fine Techno Co., Ltd.

Further, as a dispersion aid, a synergist can also be utilized according to the kind of pigments. It is preferred that the dispersants or the dispersion aids be added in an amount of from 1 to 50 parts by mass based on 100 parts by mass of pigment used. As a dispersion medium, a solvent or a polymerizable compound is utilized, however, the actinic ray curable ink used in the invention is preferably an ink containing no solvent, since curing is carried out immediately after the ink has been deposited on a recording medium. When a solvent remains in a cured image, there occurs a problem of deterioration of resistance to the solvent and VOC of the residual solvent. Therefore, as a dispersion medium, a polymerizable compound is preferable to a solvent. Especially, a monomer having the lowest viscosity is preferably used in view of dispersion suitability.

Pigment dispersion is carried out suitably selecting a pigment, a dispersant, a dispersion medium, dispersion conditions and filtering conditions so as to obtain pigment particles with an average particle size of preferably from 0.08 to 0.5 μm and a maximum particle size of from 0.3 to 10 μm and preferably from 0.3 to 3 μm. The above particle size control makes it possible to prevent clogging of a head nozzle and to maintain storage stability, transparency and curing sensitivity of ink.

The colorant concentration in the inkjet ink of the invention is preferably from 1 to 10% by mass based on the total inkjet ink.

(Printed Matter Production Process)

The printed matter production process of the invention is an image formation process forming a plane image, wherein an inkjet ink is supplied onto a recording medium to form a plane image thereon.

In the image formation according to the printed matter production process of the invention, an actinic ray curable inkjet ink is ejected through a nozzle onto a recording medium, which is a material to be printed, followed by curing of the actinic ray curable inkjet ink on the recording medium.

In the printed matter production process of the invention, an actinic ray curable inkjet ink in an ink chamber of an ink head, being maintained, for example, at a temperature of from 70 to 140° C., is ejected onto a recording medium, and cured by irradiation of an actinic ray such as ultraviolet ray, thereby forming an image.

As the recording medium, there can be used a paper support such as a plain paper, coated paper, cast coated paper or gloss paper; and a plastic film such as a polyester film, a polyolefin film, a polyvinyl chloride film, a polyvinylidene chloride film or a composite film thereof. In the invention, coated paper or a plastic film is especially preferably used as the recording medium.

(Inkjet Recording Head)

Figure 1A:
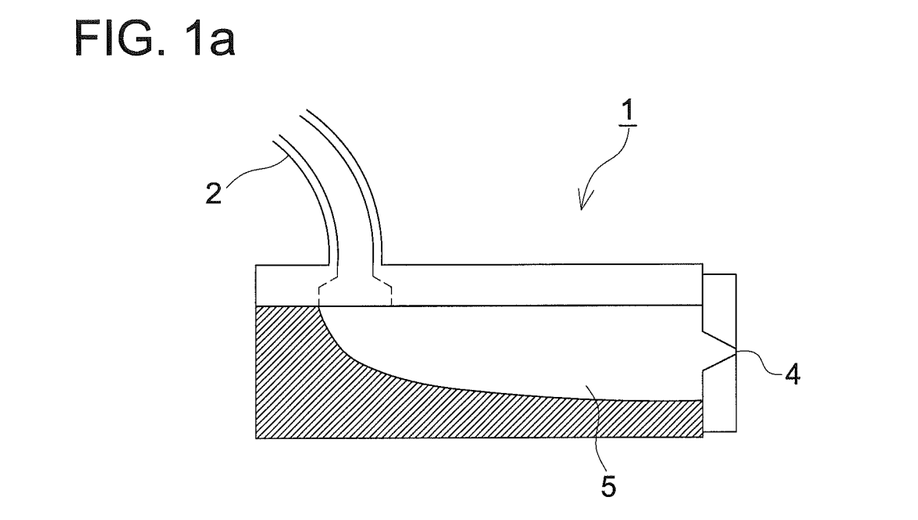
Figure 1B:
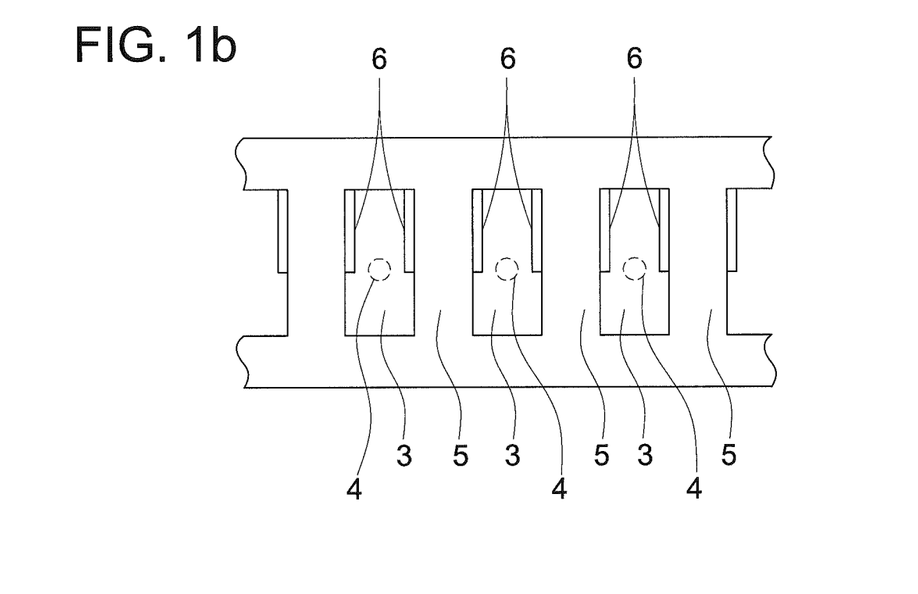

An embodiment of the inkjet recording head used in printed matter production process of the invention is shown in FIG. 1.

In the inkjet recording head 1, ink is supplied from the ink tube 2 to the ink chamber 3, and ejected from the ink nozzle 4.

The ink chamber 3 is separated by the partition wall 5. T partition wall 5 has a piezoelectric element, which is a piezoelectric material having electrodes. The ink can be ejected by motion of this piezoelectric element.

EXAMPLES

Next, the present invention will be explained in detail referring to examples, but the present invention is not limited thereto. In the examples, "parts" and "%" represent parts by mass and % by mass, respectively, unless otherwise specified.

<<Preparation of Ink>>

Inventive Ink Samples 1-1, 1-2, 2-1, 2-2, 3-1 through 3-4 and 4-1 through 4-3 and Comparative Ink Samples 1-1 through 1-4, 2-1 through 2-4, 3-1 through 3-4 and 4-1 through 4-3 were prepared as described later. Polymerizable compounds used (in which polymerizable compounds 1 through 7 and 16 are the polymerizable compounds in the invention, and polymerizable compounds 8 through 15 are comparative polymerizable compounds) are shown in Table 1, and other compounds in Table 2. The amounts of the components used in the ink composition are shown in Tables 3 through 6.

Polymerizable Compounds and Pigment Dispersants

Ajisper PE-824 (produced by Aj inomoto Fine Techno Co., Ltd.) is incorporated into a stainless steel beaker and dissolved by heating.

The resulting solution was cooled to room temperature, and added with pigment (cyan pigment: Blue No. 32). The resulting mixture was incorporated into a glass bottle together with zirconia beads with a particle size of 0.5 mm, tightly sealed, and subjected to dispersion employing a paint shaker.

The resulting dispersion was added with a gelling agent, heated at 100° C., and mixed while stirring for one hour to dissolve the gelling agent. After that, the resulting mixture, while maintaining at 100° C., was added with a photopolymerimtion initiator, a polymerization inhibitor, and a surface active agent, and mixed with stirring. Then, the resulting mixture was filtered with a metal mesh filter of a #3500 mesh to remove the zirconia beads.

Each of the ink samples obtained as above formed a gel phase at 20° C., and had a phase transition temperature within the temperature range of from 25 to 80° C., the phase transition temperature measured according to DSC.

TABLE 1

| Polymerizable Compound | Trade Name | Maker | Functional Group Number | Molecular weight | Viscosity at 25° C. (mPa · sec) |
|---|---|---|---|---|---|
| 1 | A-400 | a) | 2 | 508 | 58 |
| 2 | SR603 | b) | 2 | 498 | 85 |
| 3 | CD561 | b) | 2 | 444 | 46 |
| 4 | APG-400 | a) | 2 | 536 | 34 |
| 5 | 14G | a) | 2 | 736 | 64 |
| 6 | APG-700 | a) | 2 | 808 | 68 |
| 7 | 9G | a) | 2 | 536 | 35 |
| 8 | M-90G | a) | 1 | 468 | 23 |
| 9 | SR552 | b) | 1 | 693 | 39 |
| 10 | SR213 | b) | 2 | 198 | 8 |
| 11 | SR272 | b) | 2 | 258 | 15 |
| 12 | A-600 | a) | 2 | 708 | 106 |
| 13 | SR348 | b) | 2 | 452 | 1082 |
| 14 | SR295 | b) | 4 | 352 | 342 |
| 15 | SR355 | b) | 4 | 482 | 600 |
| 16 | A-DCP | a) | 2 | 304 | 135 | a): Shin-Nakamura Chemical Co. Ltd.
b): Sartomer Co., Ltd.

TABLE 2

| Compounds | Name | Maker |
| --- | --- | --- |
| Gelling Agent | STEARONE | Kao Co., Ltd. |
| Gelling Agent | RHEOPEARL ISK2 | Iwase Cosfa Co., Ltd. |
| Gelling Agent | NOMUCOAT HK-P | Nissin Oillio Group Co., Ltd. |
| Gelling Agent | Hentriacontanone-16-one | Kao Co., Ltd. |
| Photopolymerization initiator | IRGACURE 379 | Ciba Japan Co., Ltd. |
| Photopolymerization initiator | DAROCURE TPO | Ciba Japan Co., Ltd. |
| Photopolymerization initiator | SPEEDCURE EDB | Shin-etsu Silicone Co., Ltd. |
| Photopolymerization initiator | KAYACURE DETX-S | Nippon Kayaku Co., Ltd. |
| Polymerization Inhibitor | IRGACURE UV-10 | Ciba Japan Co., Ltd. |
| Surface Active Agent | KF351 | Shin-etsu Silicone Co., Ltd. |
| Pigment | Blue No. 12 | Nippon Kayaku Co. Ltd. |
| Dispersant | Ajisper PE-824 | Ajinomoto Fine Techno Co., Ltd. |

TABLE 3

| | Components | | | | Ink Composition | | | | | |
| --- | --- | --- | --- | --- | --- | --- | --- | --- | --- | --- |
| | | Functional Group Number | Molecular Weight | Viscosity at 25° C. (mPasecond) | Inventive Sample 1-1 | Inventive Sample 1-2 | Comparative Sample 1-1 | Comparative Sample 1-2 | Comparative Sample 1-3 | Comparative Sample 1-4 |
| 1) | 1 (A-400) | 2 | 508 | 58 | 100 parts | 80 parts | 80 parts | 70 parts | 50 parts | |
| 1) | 8 (M-90G) | 1 | 468 | 23 | | 20 parts | 20 parts | 30 parts | 50 parts | 100 parts |
| 2) | STEARONE | | | | 5 parts | 5 parts | 5 parts | 5 parts | 5 parts | 5 parts |
| 3) | IRGACURE 379 | | | | 3 parts | 3 parts | 3 parts | 3 parts | 3 parts | 3 parts |
| 3) | DAROCURE TPO | | | | 5 parts | 5 parts | 5 parts | 5 parts | 5 parts | 5 parts |
| 3) | SPEEDCURE EDB | | | | 3 parts | 3 parts | 3 parts | 3 parts | 3 parts | 3 parts |
| 3) | KAYACURE DETX-S | | | | 3 parts | 3 parts | 3 parts | 3 parts | 3 parts | 3 parts |
| 4) | IRGACURE UV-10 | | | | 0.05 parts | 0.05 parts | 0.05 parts | 0.05 parts | 0.05 parts | 0.05 parts |
| 5) | KF351 | | | | 0.03 parts | 0.03 parts | 0.03 parts | 0.03 parts | 0.03 parts | 0.03 parts |
| 6) | Blue No. 32 | | | | 4 parts | 4 parts | 4 parts | 4 parts | 4 parts | 4 parts |
| 7) | Azisper PE-824 | | | | 1.6 parts | 1.6 parts | 1.6 parts | 1.6 parts | 1.6 parts | 1.6 parts |

1): Polymerizable Compound;
2): Gelling Agent;
3): Initiator;
4): Polymerization Inhibitor;
5): Surface Active Agent;
6): Pigment;
7): Dispersant

TABLE 4

| | Components | | | | Ink Composition | | | | | |
| --- | --- | --- | --- | --- | --- | --- | --- | --- | --- | --- |
| | | Functional Group Number | Molecular Weight | Viscosity at 25° C. (mPasecond) | Inventive Sample 2-1 | Inventive Sample 2-2 | Comparative Sample 2-1 | Comparative Sample 2-2 | Comparative Sample 2-3 | Comparative Sample 2-4 |
| 1) | 3 (CD-561) | 2 | 444 | 46 | 100 parts | 80 parts | 70 parts | 50 parts | 20 parts | |
| 1) | 14 (SR295) | 4 | 352 | 342 | | 20 parts | 30 parts | 50 parts | 80 parts | 100 parts |
| 2) | Hentriacontanone-16-one | | | | 5 parts | 5 parts | 5 parts | 5 parts | 5 parts | 5 parts |
| 3) | IRGACURE 379 | | | | 3 parts | 3 parts | 3 parts | 3 parts | 3 parts | 3 parts |
| 3) | DAROCURE TPO | | | | 5 parts | 5 parts | 5 parts | 5 parts | 5 parts | 5 parts |
| 3) | SPEEDCURE EDB | | | | 3 parts | 3 parts | 3 parts | 3 parts | 3 parts | 3 parts |
| 3) | KAYACURE DETX-S | | | | 3 parts | 3 parts | 3 parts | 3 parts | 3 parts | 3 parts |
| 4) | IRGACURE UV-10 | | | | 0.05 parts | 0.05 parts | 0.05 parts | 0.05 parts | 0.05 parts | 0.05 parts |

TABLE 4-continued

|  | Components | | | | Ink Composition | | | | | |
|---|---|---|---|---|---|---|---|---|---|---|
|  |  | Functional Group Number | Molecular Weight | Viscosity at 25° C. (mPasecond) | Inventive Sample 2-1 | Inventive Sample 2-2 | Comparative Sample 2-1 | Comparative Sample 2-2 | Comparative Sample 2-3 | Comparative Sample 2-4 |
| 5) | KF351 | | | | 0.03 parts | 0.03 parts | 0.03 parts | 0.03 parts | 0.03 parts | 0.03 parts |
| 6) | Blue No. 32 | | | | 4 parts | 4 parts | 4 parts | 4 parts | 4 parts | 4 parts |
| 7) | Ajisper PE-824 | | | | 1.6 parts | 1.6 parts | 1.6 parts | 1.6 parts | 1.6 parts | 1.6 parts |

1): Polymerizable Compound;
2): Gelling Agent;
3): Initiator;
4): Polymerization Inhibitor;
5): Surface Active Agent;
6): Pigment;
7): Dispersant

TABLE 5

|  | Components | | | | Ink Composition | | |
|---|---|---|---|---|---|---|---|
|  |  | Functional Group Number | Molecular Weight | Viscosity at 25° C. (mPasecond) | Inventive Sample 3-1 | Inventive Sample 3-2 | Inventive Sample 3-3 |
| 1) | 7(9G) | 2 | 536 | 35 | 90 parts | | |
| 1) | 5(14G) | 2 | 736 | 64 | | 90 parts | |
| 1) | 3(CD561) | 2 | 444 | 46 | | | 90 parts |
| 1) | 2(SR603) | 2 | 498 | 85 | | | |
| 1) | 12(A-600) | 2 | 708 | 106 | | | |
| 1) | 13(SR348) | 2 | 452 | 1082 | | | |
| 1) | 10(SR213) | 2 | 198 | 8 | | | |
| 1) | 11(SR272) | 2 | 258 | 15 | | | |
| 1) | 9(SR552) | 1 | 693 | 39 | 10 parts | 10 parts | 10 parts |
| 2) | RHEOPEARL ISK2 | | | | 7 parts | 7 parts | 7 parts |
| 3) | IRGACURE 379 | | | | 3 parts | 3 parts | 3 parts |
| 3) | DAROCURE TPO | | | | 5 parts | 5 parts | 5 parts |
| 3) | SPEEDCURE EDB | | | | 3 parts | 3 parts | 3 parts |
| 3) | KAYACURE | | | | 3 parts | 3 parts | 3 parts |
| 4) | IRGACURE UV-10 | | | | 0.05 parts | 0.05 parts | 0.05 parts |
| 5) | KF351 | | | | 0.03 parts | 0.03 parts | 0.03 parts |
| 6) | Blue No. 32 | | | | 4 parts | 4 parts | 4 parts |
| 7) | Ajisper PE-824 | | | | 1.6 parts | 1.6 parts | 1.6 parts |

|  | Components | Ink Composition | | | | |
|---|---|---|---|---|---|---|
|  |  | Inventive Sample 3-4 | Comparative Sample 3-1 | Comparative Sample 3-2 | Comparative Sample 3-3 | Comparative Sample 3-4 |
| 1) | 7(9G) | | | | | |
| 1) | 5(14G) | | | | | |
| 1) | 3(CD561) | | | | | |
| 1) | 2(SR603) | 90 parts | | | | |
| 1) | 12(A-600) | | 90 parts | | | |
| 1) | 13(SR348) | | | 90 parts | | |
| 1) | 10(SR213) | | | | 90 parts | |
| 1) | 11(SR272) | | | | | 90 parts |
| 1) | 9(SR552) | 10 parts | 10 parts | 10 parts | 10 parts | 10 parts |
| 2) | RHEOPEARL ISK2 | 7 parts | 7 parts | 7 parts | 7 parts | 7 parts |
| 3) | IRGACURE 379 | 3 parts | 3 parts | 3 parts | 3 parts | 3 parts |
| 3) | DAROCURE TPO | 5 parts | 5 parts | 5 parts | 5 parts | 5 parts |

TABLE 5-continued

| | | | | | |
|---|---|---|---|---|---|
| 3) SPEEDCURE EDB | 3 parts | 3 parts | 3 parts | 3 parts | 3 parts |
| 3) KAYACURE | 3 parts | 3 parts | 3 parts | 3 parts | 3 parts |
| 4) IRGACURE UV-10 | 0.05 parts | 0.05 parts | 0.05 parts | 0.05 parts | 0.05 parts |
| 5) KF351 | 0.03 parts | 0.03 parts | 0.03 parts | 0.03 parts | 0.03 parts |
| 6) Blue No. 32 | 4 parts | 4 parts | 4 parts | 4 parts | 4 parts |
| 7) Ajisper PE-824 | 1.6 parts | 1.6 parts | 1.6 parts | 1.6 parts | 1.6 parts |

1): Polymerizable Compound;
2): Gelling Agent;
3): Initiator;
4): Polymerization Inhibitor;
5): Surface Active Agent;
6): Pigment;
7): Dispersant

TABLE 6

| Components | | | | Ink Composition | | | | |
|---|---|---|---|---|---|---|---|---|
| | Functional Group Number | Molecular Weight | Viscosity at 25° C. (mPasecond) | Inventive Sample 4-1 | Inventive Sample 4-2 | Inventive Sample 4-3 | Comparative Sample 4-1 | Comparative Sample 4-4 |
| 1) 3(CD561) | 2 | 444 | 46 | 100 parts | 80 parts | 80 parts | 40 parts | 80 parts |
| 1) 15(SR355) | 4 | 482 | 600 | | 20 parts | | 40 parts | |
| 1) 16(A-DCP) | 2 | 304 | 135 | | | | | 20 parts |
| 1) n-Vinyl Caprolactam | 1 | 139 | solid | | | 20 parts | 20 parts | |
| 2) STEARONE | | | | 5 parts | 5 parts | 5 parts | 5 parts | 5 parts |
| 3) IRGACURE 379 | | | | 3 parts | 3 parts | 3 parts | 3 parts | 3 parts |
| 3) DAROCURE TPO | | | | 5 parts | 5 parts | 5 parts | 5 parts | 5 parts |
| 3) SPEEDCURE EDB | | | | 3 parts | 3 parts | 3 parts | 3 parts | 3 parts |
| 3) KAYACURE DETX-S | | | | 3 parts | 3 parts | 3 parts | 3 parts | 3 parts |
| 4) IRGACURE UV-10 | | | | 0.05 parts | 0.05 parts | 0.05 parts | 0.05 parts | 0.05 parts |
| 5) KF351 | | | | 0.03 parts | 0.03 parts | 0.03 parts | 0.03 parts | 0.03 parts |
| 6) Blue No. 32 | | | | 4 parts | 4 parts | 4 parts | 4 parts | 4 parts |
| 7) Ajisper PE-824 | | | | 1.6 parts | 1.6 parts | 1.6 parts | 1.6 parts | 1.6 parts |

1): Polymerizable Compound;
2): Gelling Agent;
3): Initiator;
4): Polymerization Inhibitor;
5): Surface Active Agent;
6): Pigment;
7): Dispersant <<Measurement of Viscosity>>

The ink viscosity is a viscosity at 25° C. and at a shear rate of 1000/second, measured employing a Rheometer MCR300 produced by Paar Physica Co., Ltd. Each ink sample was evaluated according to the following ranks:

The ranks B and C are as follows:
A: The viscosity was from 60 to 200 mPasecond.
B: The viscosity was lower than 60 mPasecond.
C: The viscosity was higher than 200 mPasecond.

<<Measurement of Phase Transition Temperature>>
Differential Scanning Calorimetry (DSC):

In the DSC220C/SSC5200 station produced by Seiko Denshi Co., Ltd., temperature of the ink sample is changed from 20° C. to 100° C. and then from 100° C. to 20° C. under a nitrogen atmosphere at a rate of 10° C./minute, and a temperature giving an exothermic peak at the temperature falling process from 100° C. to 20° C. is defined as the phase transition temperature.

<<Inkjet Image Formation Process>>

Each of the ink samples prepared above was incorporated in a single pulse inkjet recording apparatus (with an effective recording width of 200 mm) in which piezo-type inkjet nozzles are linearly provided. Employing the apparatus, image recording was continuously carried out, corresponding to evaluations below.

The ink supply system is composed of an ink tank, an ink supply pipe, a pre-ink tank just downward a head, a tube with a filter, and a piezohead. The section from the pre-ink tank to the head was heated. The ink was ejected as droplets with a size of 4 pl, and an image was recorded at a resolution of 1200×1200 dpi. The ink ejected onto a recording medium was exposed to ultraviolet rays at an exposure amount of 600 mJ/cm$^2$ over the entire recording width. Herein, dpi refers to a dot number per 2.54 cm.

(Evaluation of Ink Ejection Stability)

A solid image was recorded on the entire surface of an A4 art paper for printing OK KINFUJI according to the image formation process described above. Herein, the paper sheet being transported at a speed of 10 m/second, 50 m/second and 100 m/second, the image was recorded on one hundred sheets of paper at each speed. Then, it was checked whether or not white spots (unprinted spots) were observed in the image of one hundredth copy, whereby it was checked whether or not normal ejection of the ink from all the nozzles was carried out, and ink ejection stability was evaluated according to the following ranks. Ranks A and B are preferred from a practical point of view.
A: No white spots were observed.
B: Three portions of white spots were observed.
C: Not more than ten portions of white spots were observed.
D: More than 10 portions of white spots were observed.
E: No ink ejection was carried out
(Evaluation of Image)
Employing art paper and plain paper, image quality was evaluated as follows. Further, adhesion property and sensitivity were evaluated as a measure of image stability.
<<Image Quality on Art Paper>>
A Mincho font four-point Chinese character "薔" was recorded on an A4 art paper for printing, OK KINFUJI. The resulting recorded character was visually observed, and evaluated according to the following ranks. Ranks A and B are preferred from a practical point of view.
A: No bleeding was observed, and printability was satisfactory.
B: A slight of bleeding and a slight of printing disorder were observed.
C: Bleeding was observed but the character was decipherable.
D: The character was indecipherable on account of the bleeding.
<<Image Quality on Plain Paper>>
A Mincho font four-point Chinese character "薔" was recorded on an A4 woodfree paper OK PRINCE JOSHITSU (Produced by Oji Seishi Co., Ltd.). The resulting recorded character was visually observed, and evaluated according to the following ranks. Ranks A and B are preferred from a practical point of view.
A: No bleeding was observed, and printability was satisfactory.
B: A slight of bleeding and a slight of printing disorder were observed.
C: Bleeding was observed but the character was decipherable.
D: The character was indecipherable on account of the bleeding.
<<Evaluation of Adhesion Property>>
Cross-Cut Adhesion Test
A solid image was recorded on the entire surface of an A4 art paper for printing, namely, OK KINFUJI, according to the image formation process as described above.
Adhesive tape SCOTCH #250 (produced by SUMTTOMO 3M CO., LTD.) was laminated onto a test sample obtained from the recorded sample according to the cross-cut adhesion test of JIS K 5400, and press adhered onto the test sample with a 2 kg roller reciprocated one time. After that, the tape was quickly peeled from the test sample, and the number of remaining tesserae in the test sample was counted and adhesion property was evaluated according to the following ranks. Rank A is preferred from a practical point of view.
A: Remaining rate of the tesserae was not less than 90%.
B: Remaining rate of the tesserae was from 80% to less than 90%.
C: Remaining rate of the tesserae was from 70% to less than 80%.
D: Remaining rate of the tesserae was from 50% to less than 70%.
E: Remaining rate of the tesserae was less than 50%.
<<Sensitivity>>
A solid image was recorded on the entire surface of an A4 art paper for printing, namely, OK KINFUJI, according to the image formation process as described above. Immediately after the recording, the solid image was rubbed with a cotton-tipped stick, and curability of the image was checked and evaluated according to the following ranks. Ranks A and B are preferred from a practical point of view.
A: There are no scratches on the image.
B: A slight of scratches are observed.
C: The image was peeled from the paper.
(Evaluation of Printed Matter Deformation)
Curl was checked as follows, and evaluated as a measure of the printed matter deformation.
<<Evaluation of Curl>>
A solid image (200 mm×300 mm) was recorded on a PET film cut into 210 mm×300 mm (with a thickness of 80 μm), according to the image formation process as described above. The recorded specimen was put on a flat desk with the recorded side facing upward. Of the heights from the desk surface of the four corners of the specimen which are distant from the desk surface, the maximum height was evaluated as a measure of curl according to the following ranks. Ranks A and B are preferred from a practical point of view.
A: The maximum height was less than 3 mm
B: The maximum height was from 3 mm to less than 5 mm.
C: The maximum height was from 5 mm to less than 10 mm.
D: The maximum height was from 10 mm to less than 30 mm.
E: The maximum height was not less than 30 mm.
The above evaluation results are collectively shown in Table 7.
Inventive Ink samples were prepared in the same manner as in Inventive Ink Sample 3-3, except that a polymerizable compound 5 or 6 was used, and evaluated in the same manner as above. As a result, the resulting Inventive Ink samples provided the same results as in Inventive Ink Sample 3-3.

TABLE 7

| Ink | Remarks (Polymerizable Compound in the invention, see Table 3) | Ink Viscosity | Ejection Stability | Image Quality on Art Paper | Image Quality on plain Paper | Adhesion Property | Sensitivity | Curl |
|---|---|---|---|---|---|---|---|---|
| Inventive Sample 1-1 | Contained as Main Component | A | A | A | A | A | B | A |
| Inventive Sample 1-2 | Contained as Main Component | A | A | A | A | A | B | A |
| Comparative Sample 1-1 | Not Contained as Main Component | A | A | B | C | A | B | A |
| Comparative Sample 1-2 | Not Contained as Main Component | B | B | C | D | B | C | A |
| Comparative Sample 1-3 | Not Contained as Main Component | B | C | C | D | B | C | A |
| Comparative Sample 1-4 | Not Contained as Main Component | B | E | Incapable of Evaluation | Incapable of Evaluation | Incapable of Evaluation | Incapable of Evaluation | Incapability of Evaluation |

TABLE 7-continued

| Ink | Remarks (Polymerizable Compound in the invention, see Table 4) | Ink Viscosity | Ejection Stability | Image Quality on Art Paper | Image Quality on plain Paper | Adhesion Property | Sensitivity | Curl |
|---|---|---|---|---|---|---|---|---|
| Inventive Sample 2-1 | Contained as Main Component | A | A | A | A | A | B | A |
| Inventive Sample 2-2 | Contained as Main Component | A | A | A | A | A | A | A |
| Comparative Sample 2-1 | Not Contained as Main Component | C | C | A | A | A | A | D |
| Comparative Sample 2-2 | Not Contained as Main Component | C | E | Incapable of Evaluation | Incapable of Evaluation | Incapable of Evaluation | Incapable of Evaluation | Incapability of Evaluation |
| Comparative Sample 2-3 | Not Contained as Main Component | C | E | Incapable of Evaluation | Incapable of Evaluation | Incapable of Evaluation | Incapable of Evaluation | Incapability of Evaluation |
| Comparative Sample 2-4 | Not Contained as Main Component | C | E | Incapable of Evaluation | Incapable of Evaluation | Incapable of Evaluation | Incapable of Evaluation | Incapability of Evaluation |

| Ink | Remarks (Polymerizable Compound in the invention, see Table 5) | Ink Viscosity | Ejection Stability | Image Quality on Art Paper | Image Quality on plain Paper | Adhesion Property | Sensitivity | Curl |
|---|---|---|---|---|---|---|---|---|
| Inventive Sample 3-1 | Polymerizable Compound in the invention | A | A | A | A | A | A | A |
| Inventive Sample 3-2 | Polymerizable Compound in the invention | A | A | A | A | A | A | A |
| Inventive Sample 3-3 | Polymerizable Compound in the invention | A | A | A | A | A | B | A |
| Inventive Sample 3-4 | Polymerizable Compound in the invention | A | A | A | A | A | A | B |
| Comparative Sample 3-1 | Viscosity 106 mPasecond | A | A | B | B | C | B | A |
| Comparative Sample 3-2 | Viscosity 1082 mPasecond | C | D | B | B | A | A | B |
| Comparative Sample 3-3 | Molecular Weight 198 | A | A | C | D | C | C | A |
| Comparative Sample 34 | Molecular Weight 258 | A | A | C | C | B | C | A |

| Ink | Remarks (Polymerizable Compound in the invention, see Table 6) | Ink Viscosity | Ejection Stability | Image Quality on Art Paper | Image Quality on plain Paper | Adhesion Property | Sensitivity | Curl |
|---|---|---|---|---|---|---|---|---|
| Inventive Sample 4-1 | Polymerizable Compound in the invention | A | A | A | A | A | B | A |
| Inventive Sample 4-2 | Polymerizable Compound in the invention | A | A | A | A | A | A | B |
| Inventive Sample 4-3 | Polymerizable Compound in the invention | A | A | A | B | A | B | A |
| Comparative Sample 4-1 | One disclosed in Japanese Unexamined Patent Application Publication (Translation of PCT Application) No. 2009-510184 | C | D | B | B | A | A | D |
| Inventive Sample 4-4 | Polymerizable Compound in the invention | A | A | A | A | A | A | A |

As is apparent from Table 7, the printed matter production process of the invention excels in ink ejection properties, enables high speed printing, and provides a printed matter having an image with high precision image quality, excellent stability and reduced deformation.

Further, as is apparent from Tables 3, 4 and 7, particularly when the polymerizable compound in the invention is used as the main component of the polymerizable compound, the effects as described above are exhibited.

Furthermore, as is apparent from Tables 5 and 7, only when the polymerizable compound in the invention having two functional groups and having a specific molecular weight and a specific viscosity is used as the polymerizable compound, the effects as described above are exhibited.

EXPLANATION OF THE SYMBOLS

1: Inkjet Recording Head
2: Ink Tube
3: Ink Chamber
4: Nozzle
5: Partition Wall
6: Electrodes

The invention claimed is:

1. A printed matter production process comprising the steps of:
providing an actinic ray curable inkjet ink containing a polymerizable compound, a photopolymerization initiator and a gelling agent, having a viscosity of from 60 to 200 mPa·second at 25° C. and at a shear rate of 1000/second and having a phase transition temperature of not lower than 25° C.;
heating the actinic ray curable inkjet ink to the phase transition temperature or higher; and
ejecting droplets of the heated actinic ray curable inkjet ink through a head to supply the droplets onto a recording medium, thereby forming an image, wherein the actinic ray curable inkjet ink contains a bifunctional polymerizable compound with a molecular weight of not lower than 400 and with a viscosity at 25° C. of not more than 100 mPa·second in an amount of not less than 75% by mass of the total amount of the polymerizable compound.

2. The printed matter production process as described in claim 1, wherein the actinic ray curable inkjet ink contains the gelling agent in an amount of from 3.0 to 20% by mass.

3. The printed matter production process as described in claim 1, further comprising the step of curing the droplets supplied on the recording medium by irradiation of an actinic ray.

4. A printed matter produced according to the printed matter production process as described in claim 1.

5. An actinic ray curable inkjet ink containing a polymerizable compound and a gelling agent, having a viscosity of from 60 to 200 mPa·second at 25° C. and at a shear rate of 1000/second, and having a phase transition temperature of not lower than 25° C., wherein the actinic ray curable inkjet ink contains a bifunctional polymerizable compound with a molecular weight of not lower than 400 and with a viscosity at 25° C. of not more than 100 mPa·second in an amount of not less than 75% by mass of the total amount of the polymerizable compound.

6. The actinic ray curable inkjet ink of claim 5, wherein the actinic ray curable inkjet ink further contains a photopolymerization initiator.

* * * * *